March 14, 1950     J. A. HARRINGTON     2,500,313
GAUGE BLOCK
Filed March 30, 1946
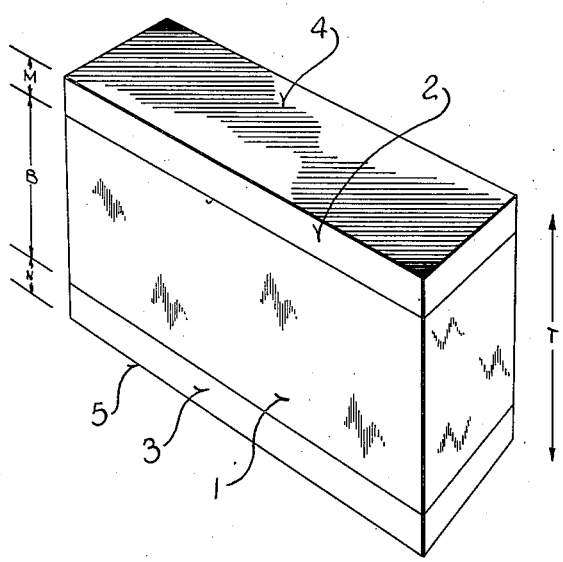
Inventor
John A. Harrington Patented Mar. 14, 1950

2,500,313

UNITED STATES PATENT OFFICE 2,500,313

GAUGE BLOCK

John A. Harrington, Minneapolis, Minn., assignor to Continental Machines, Inc., Minneapolis, Minn., a corporation of Minnesota Application March 30, 1946, Serial No. 658,373

2 Claims. (Cl. 33—168)

This invention relates to gage blocks, and more particularly to a novel and improved gage block having a coefficient of expansion substantially equal to that of the member or material to be gaged.

It is well known that precision gage blocks are finished to size, flatness and parallelism with such fineness that their surfaces are accurate to within one to two millionths of an inch of specifications. In order that such blocks may have a reasonably long useful life it is necessary that their gaging faces be made of a hard material.

In the past, gage blocks have been made of steel, and although this provides reasonable resistance to wear, the usefulness of steel gage blocks is greatly restricted by temperature factors when such blocks are employed in connection with members and materials having coefficients of expansion different from that of steel. Thus, gage blocks are normally finished in rooms which are air conditioned to some fixed temperature, such as 70° F., and they will be accurate only at that temperature.

If a steel gage block is to be used for gaging a steel member, ambient temperature is not critical. Although the block and member will have the specified gaging dimension only at the specified temperature, they will match one another at any temperature, since both expand and contract at the same rate. If, however, the gage block is to be used with some other type of material, room temperature must be held within very narrow limits, since the steel gage block will not have the same coefficient of expansion as the member to be gaged.

On the other hand, a gage block made of the same material as the member to be gaged would in most cases be impractical. An aluminum gage block, for example, would be too soft for practical use, even if it could be accurately produced.

It is therefore an object of this invention to provide a practical gage block which will have a predetermined coefficient of linear expansion, equal to that of the member or material to be gaged.

A further object of this invention resides in the provision of a new and novel gage block which need not be kept at a specified temperature when gaging material with which it is designed to be used, but which will nevertheless have a long useful life.

With the above and other objects in view, which will appear as the description proceeds, this invention resides in the novel construction and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which the single figure represents a perspective view of one embodiment of the gage block of this invention.

Referring to the drawing, the numeral 1 designates a body member of relatively soft material, and the numerals 2 and 3 designate gaging wear surfaces of harder material bonded to the body member. The opposing faces 4 and 5 of the gaging wear members are finished to size, flatness and parallelism.

One method of bonding the gaging wear surfaces 2 and 3 to the body member 1 and finishing the gaging faces 4 and 5 is that described in my copending patent application, Serial No. 650,885, for Improved gage block and method of making the same, now abandoned.

The coefficient of expansion which the finished gage block is to have is dependent upon the materials selected for the body and gaging surface members, and upon the relative thicknesses of those members.

For example, let it be assumed that a one inch gage block is desired, having substantially the same coefficient of linear expansion as aluminum, namely 12.3 microinches (.0000123") per inch per degree Fahrenheit. The body member 1 may be made of zinc, which has a coefficient of linear expansion of 14.07 microinches (.00001407") per inch per degree Fahrenheit, and may be made .700 inch in size along the gaging dimension ($b$ in the drawing). The wear surfaces 2 and 3 may then be made of cobalt, which has a coefficient of linear expansion of 9.00 microinches (.00000900") per inch per degree Fahrenheit, and each gaging surface would be .150 inch in size along the gaging dimension ($m$ and $n$ in the drawing).

Thus, if the resulting gage block were subjected to a temperature rise of one degree (1°) Fahrenheit, the expansion of the zinc body member 1 would be 14.07×.700 or 9.8 microinches. The expansion of the two wear surfaces 2 and 3 would be 2×9.00×.15 or 2.7 microinches. The total linear expansion of the gage block along the gaging dimension T would then be equal to the sum of the expansions of its members, or 2.7+9.8 or 12.5 microinches (.0000125″), which is substantially equal to the coefficient of expansion of aluminum.

If even greater accuracy were desired, the zinc of the body member 1 might be alloyed with cobalt, so as to give it a slightly lower coefficient of expansion, or the size $b$ of the body member 1 might be reduced and the sizes $m$ and $n$ of the wear members 2 and 3 be proportionately increased so that the resultant block would have exactly the desired coefficient of expansion.

Such a block could then be used for accurate gaging of aluminum parts at any room temperature, so long as both the block and the member to be gaged were kept at the same temperature.

In general, a gage block of any size may be produced, having any desired coefficient of linear expansion $C_E$, by arranging the body and wear members so that there exists among them the relationship $$C_E = \frac{MC_m}{T} + \frac{BC_b}{T} + \frac{NC_n}{T}$$

where the notation $T$ denotes the height of the entire block along the gaging dimension, $M$ denotes the height of one wear member along the gaging dimension of the block, $N$ denotes the height of the other wear member along the gaging dimension, $B$ denotes the height of the body member along said dimension, and $C_m$, $C_b$ and $C_n$ are the coefficients of linear expansion of said members, respectively. This relationship follows from the fact that the expansion of the block as a whole is equal to the sum of the expansions of its parts.

It follows as an obvious corollary that the rate of expansion ($R_E$) of a block (i. e., its actual expansion per degree rise in temperature expressed, e. g., in micro inches) is given by $$R_E = BC_e + MC_m + NC_n$$

the notations having the same significance as in the preceding formula.

From the foregoing description taken in connection with the accompanying drawing, it will be readily apparent that this invention provides a new and improved gage block, having a coefficient of expansion equal to that of a specified material to be gaged, and having long life and a high degree of accuracy.

What I claim as my invention is:

1. A gage block having a predetermined coefficient of linear expansion substantially equal to that of material to be gaged, comprising: a body member having a coefficient of expansion higher than that of the material to be gaged; and harder gaging wear members bonded to said body member and having a coefficient of expansion lower than that of the material to be gaged, the dimensions of said body and wear members along the gaging dimension of the block being so related to one another that the coefficient of linear expansion of the block along said dimension is substantially equal to that of the material to be gaged.

2. A gage block having a predetermined desired rate of expansion comprising: a body member having a higher coefficient of expansion than the material to be gaged by the block; and gaging wear surfaces bonded to said body member and having a lower coefficient of expansion than the material to be gaged; the sizes of said body member and said wear surfaces along the gaging dimension being so selected that the sum of their rates of expansion is substantially equal to said predetermined desired rate of expansion.

JOHN A. HARRINGTON.

REFERENCES CITED

The following references are of record in the file of this patent:

UNITED STATES PATENTS

| Number | Name | Date |
|---|---|---|
| 2,039,141 | Brault | Apr. 28, 1936 |
| 2,355,007 | Mitchell | Aug. 1, 1944 |

OTHER REFERENCES

Pub.: Chemical Industries, pages 515, 516, October 1943, LIII, 4.